US007626285B2

(12) United States Patent
Lloyd

(10) Patent No.: US 7,626,285 B2
(45) Date of Patent: Dec. 1, 2009

(54) RF SWITCH TELEMETRY SYSTEM AND METHOD

(75) Inventor: David W. Lloyd, South Pasadena, CA (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 11/775,595

(22) Filed: Jul. 10, 2007

(65) Prior Publication Data

US 2009/0015073 A1 Jan. 15, 2009

(51) Int. Cl.
*B23K 11/24* (2006.01)
*H02B 1/24* (2006.01)

(52) U.S. Cl. .................................................... 307/112

(58) Field of Classification Search ................. 307/112; 324/415, 418; 361/166, 191
See application file for complete search history.

(56) References Cited

U.S. PATENT DOCUMENTS 4,695,840 A 9/1987 Darilek
4,918,566 A 4/1990 Brodsky et al.
5,670,881 A * 9/1997 Arakawa et al. ............ 324/322
5,966,311 A * 10/1999 Stemporzewski et al. ... 700/281

FOREIGN PATENT DOCUMENTS

GB 1254788 A 11/1971
WO WO2005/050871 6/2005

OTHER PUBLICATIONS

UK Combined Search and Examination Report dated Sep. 23, 2008 for Application No. GB0812708.6.

* cited by examiner

*Primary Examiner*—Albert W Paladini
*Assistant Examiner*—Carlos Amaya
(74) *Attorney, Agent, or Firm*—Rozenblat IP LLC

(57) ABSTRACT

The position of an RF switch, or switches, in a matrix switch drive system is monitored using AC rather than DC measurement techniques. Using the same wiring as the matrix switch drive system so as not to increase the size and weight of the switch installation, a low current AC signal is provided during non-actuation of the RF switch(es) to each of plural combinations of a capacitor and a microswitch serially connected across each switch coil. With the capacitor and switch coil exhibiting inverse impedance responses to increasing AC frequency, when the microswitch is open only the coil impedance is read and when the microswitch is closed only the capacitor impedance is read. Using a switch coil with an inductance of 1 henry and a capacitor with a capacitance of 0.1 farads, the difference in impedance between the microswitch ON and OFF states is an easily detectable two orders of magnitude.

21 Claims, 2 Drawing Sheets

RF SWITCH TELEMETRY SYSTEM AND METHOD

FIELD OF THE INVENTION

This invention relates generally to one or more RF switches controlled by a matrix switch drive system and is particularly directed to an arrangement for using the same wires to both control and monitor the state of one or more RF switches.

BACKGROUND OF THE INVENTION

Many telecommunications systems employ switches which transmit radio frequency (RF) signals. One application for these types of RF switches is in spacecraft communications wherein an uplink RF signal may be transmitted as a downlink RF signal. These types of telecommunications systems frequently make use of large numbers of RF switches, with the individual switches controlled by a matrix switch driver arrangement. The matrix switch driver arrangement itself employs a matrix array of typically two-position switches to selectively activate individual RF switches by turning on the appropriate row and column switches. This approach is feasible because only one RF switch at any given time is activated in these types of telecommunications systems.

Referring to FIG. 1, there is shown a simplified combined block and schematic diagram of a prior art RF switch telemetry system 10. The RF switch telemetry system 10 includes the combination of an electromagnetic interference (EMI) filter 12 and a current limiter 14 connected to a power bus for energizing one or more RF switches which include coils L11, L21, L31 and L41. Each of these coils L11, L21, L31 and L41 is electromagnetically coupled to a respective magnetically sensitive arm (not shown for simplicity) for moving the arm in changing the position, or state, of the RF switch. Coils L21 and L41 are connected to the current limiter 14 by means of a first two-position switch S11, while coils L11 and L31 are connected to the current limiter by means of a second two-position switch S21. Diodes 26*b* and 26*d* are respectively coupled between coils L21 and L41 and the first switch S11. Similarly, diodes 26*a* and 26*c* are respectively coupled between coils L11 and L31 and the second switch S21. In the output stage, coils L11 and L21 are connected to a third two-position switch S31, while coils L31 and L41 are connected to a fourth two-position switch S41. A switch controller 15 is connected to each of the switches S11, S21, S31 and S41 for controlling the position of each of these four switches. By selectively actuating one of switches S11 and S21 and one of switches S31, and S41, any one of coils L11, L21, L31 and L41 may be actuated. As each of these four coils may be either in a single RF switch or may be in two or more RF switches, this arrangement allows either for four positions of one RF switch to be selected or for one or more positions to be selected in 2-4 RF switches under the control of a switch controller 15 connected to the four RF switch coils. Controller 15 may be either under automatic, pre-programmed control, or may be under the control of a communications system operator.

In many of these RF switch applications, the RF switches are remotely located, such as in an isolated telecommunications switching center or in a spacecraft. Because of the remoteness and unavailability of the RF switch network, it is essential for proper and reliable operation of the network that those responsible for operation of the telecommunications system know the status, or position, of each of the RF switches in the network. In the following discussion, the terms "position" and "state" of a switch are used interchangeably.

The position of the RF switch may be indicated by connecting a small microswitch 16 across the coils L5 of the RF switch is shown in FIG. 2. The microswitch 16 is ganged either physically or magnetically to a shaft of the RF switch which is electromagnetically coupled to coil L5, but is not shown in the figures for simplicity. This switch position indicating arrangement is provided by some RF switch manufacturers as an option. In the case of a spacecraft, separate wires must be run from the spacecraft telemetry unit(s) to each microswitch in order to interrogate the position of microswitch 16 and report it in the telemetry downlink. This approach suffers from the following disadvantages:

- increases harness layout and a routing complexity, thus increasing the non-recurring harness cost;
- adds significant harness weight and recurring cost;
- increases spacecraft integration complexity and schedule; and
- requires significantly more telemetry channel inputs in the telemetry subsystem hardware, increasing the weight and recurring cost of the hardware.

The approach shown in FIG. 2 of connecting a microswitch 16 across the coil L5 of an RF switch for indicating the position of the switch is also impractical for two technical reasons. First, when the microswitch 16 moves from the open to the closed position, or vice versa, severe arcing will take place because the drive current to the coil 5 is on the order of 2 amps. This could result in damage to the microswitch 16, or even fusing of the contacts of the RF switch. In addition, when the microswitch 16 is in the closed position, it "steals" current from the switch coil L5 when actuated (all the drive current will flow through the microswitch and not the switch coil), thus making it impossible to change the position of the RF switch.

Simply adding a small resister 20 between an RF switch coil L6 and a microswitch 18 as shown in FIG. 3 for providing an indication of the position of the RF switch also does not solve the problem. While resister 20 may prevent damage to microswitch 18 when the microswitch moves from one position to another, this approach is also impractical. The current through microswitch 18 should be limited to no more than 10% of the total current required to activate the RF switch. The RF switch requires on the order of 2 amps through the approximately 15 ohm coil for roughly 500 milliseconds to ensure activation of the RF switch. Therefore, microswitch current should be limited to 0.2 amps, which results in a value for resister 20 of approximately 150 ohms. When microswitch 18 is open, the resistance of coil L6 is 15 ohms. However, when microswitch 18 is closed, the effective parallel combination of the 15 ohm coil L6 and the 150 ohm resister 20 is in the area of 13.6 ohms. The difference between 15 ohms and 15.6 ohms is difficult to determine even with a calibrated ohmmeter. However, the primary problem is that when "real world" component tolerances are applied (due to specification tolerances, temperature, aging, harness lengths, etc.), in the worst case it becomes virtually impossible to discriminate between open and closed microswitch states. Therefore, another, more reliable and repeatable approach is required for accurately and reliably monitoring the status of RF switches in a telecommunications system.

The present invention addresses the aforementioned limitations of the prior art by providing for the accurate and reliable control and monitoring of the position of one or more RF switches in a telecommunications system using existing RF switch wiring without increasing the weight, cost or integration complexity of the RF complexity of the RF switch position telemetry installation.

SUMMARY OF THE INVENTION

The present invention contemplates apparatus for controlling and monitoring a multi-position RF switch, the apparatus comprising plural coils disposed in the RF switch, each of the coils corresponding to a position of the RF switch; plural first switches connected to a DC source and further connected to the plural coils via a wiring network for directing a DC signal through at least one of the coils for switching the RF switch to a selected position; plural serially connected second switch and capacitor combinations each coupled across a respective coil; plural third switches connected to an AC source and further connected to the plural coils and second switch and capacitor combinations coupled across each coil for directing an AC input signal thereto via the wiring network, wherein a DC signal provided to a coil results in closure of a second switch coupled across the coil and an AC output signal representing the coil energized by the DC signal and the state of the RF switch; and a controller coupled to the first and third switches for providing the AC signal to the third switches only when a DC signal is not being provided via the first switches to the coils.

This invention provides RF our switch position telemetry for potentially hundreds of RF switches using the same wiring which is used to activate the RF switches without increasing the wiring harness weight, complexity or cost. Thus, this invention provides a highly accurate, safe and reliable system and method for providing RF switch position telemetry which is particularly adapted for use in spacecraft which employ large numbers of RF switches.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanied drawings, where like reference characters identify like elements throughout the various figures, in which:

DETAILED DESCRIPTION OF A PREFERRED EMBODIMENT

Figure 1:
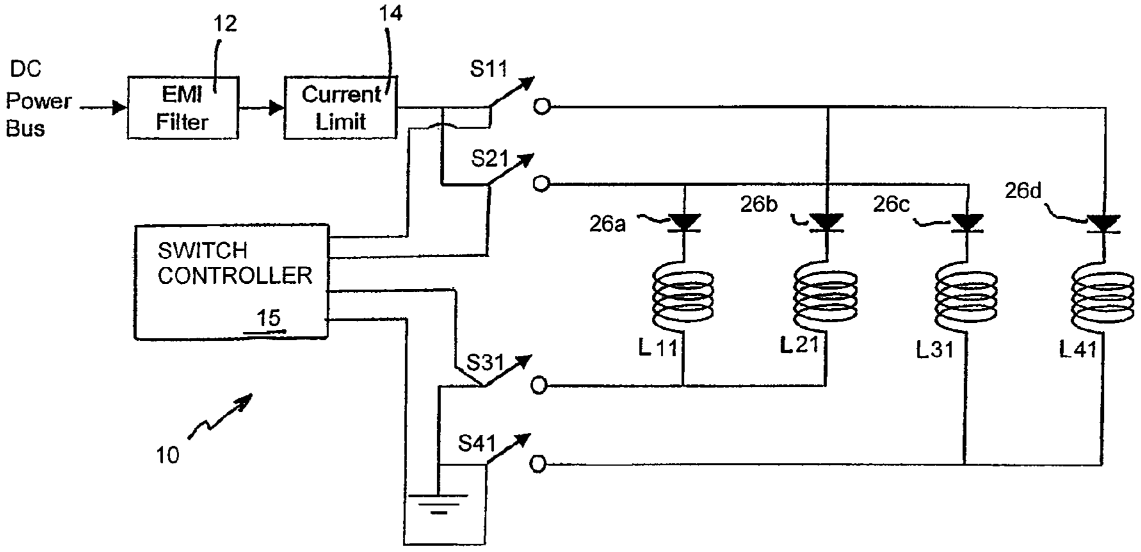
FIG. 1 (Prior Art)
FIG. 1 is a combined block and schematic diagram of a conventional RF switch telemetry control system currently in use.
Figure 2:
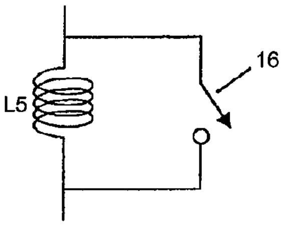
FIG. 2 is a simplified schematic diagram of one arrangement for monitoring the status of an RF switch in a telemetry system.
Figure 3:
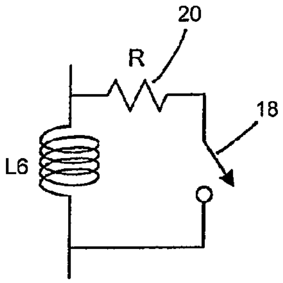
FIG. 3 is a simplified schematic diagram of another arrangement for monitoring the position of an RF switch in a telemetry system.
Figure 4:
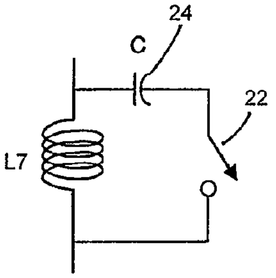
FIG. 4 is a simplified schematic diagram of an arrangement for monitoring the status of an RF switch in a telemetry system in accordance with the principles of the present invention.

Referring to the FIG. 4, there is shown a simplified schematic diagram of an arrangement for providing information regarding the position of an RF switch incorporating coil L7. The arrangement of FIG. 4 includes a capacitor 24 and a microswitch 22 coupled together in series and further coupled across RF switch coil L7. Operation of the arrangement of FIG. 4 is described in detail below in the context of an RF switch telemetry control and monitoring system 30 shown in combined block and schematic diagram form in FIG. 5.

RF switch telemetry control and monitoring system 30 includes plural coils L1, L2, L3 and L4 incorporated in at least one RF switch. Thus, the four coils could be disposed in a single RF switch or the coils may be disposed in two, three or four individual RF switches. The present invention is adapted for providing information regarding the position of either a single RF switch or the positions of plural RF switches in an RF switch telemetry control and monitoring system 30 using AC rather than DC measurement techniques.

RF switch telemetry control and monitoring system 30 further includes four drive switches S1, S2, S3 and S4. Drive switches S1 and S2 are connected to a DC power bus by means of the combination of an EMI filter 32 and a current limiter 34. Drive switch S1 is connected via diodes 36*b* and 36*d* to coils L2 and L4, respectively, for providing a DC control input thereto. Similarly, drive switch S2 is connected via diodes 36*a* and 36*c*, respectively, to coils L1 and L3 for providing a DC control input thereto. Drive switches S3 and S4 are respectively coupled to the output ends of coils L1 and L2 and coils L3 and L4. Connected across coil L1 is the serial combination of capacitor C1 and microswitch S9. Coupled across coil L2 is the serial combination of capacitor C2 and microswitch S10. Coupled across coil L3 is the serial combination of capacitor C3 and microswitch S111. Finally, coupled across coil L4 is the serial combination of capacitor C4 and microswitch S12. A DC input signal is provided to one of coils L1, L2, L3 and L4 depending upon the position of each of drive switches S1-S4. Thus, for example, closure of switches S1 and S4 causes the DC input to be provided to coil L4. Similarly, closure of drive switches S2 and S3 causes the DC input to be provided to coil L1. It is in this manner that the DC input is selectively provided to one of the coils so as to move the RF switch to one of four positions, or to change the positions of one of plural RF switches when each of the coils is disposed in a different RF switch.

Figure 5:
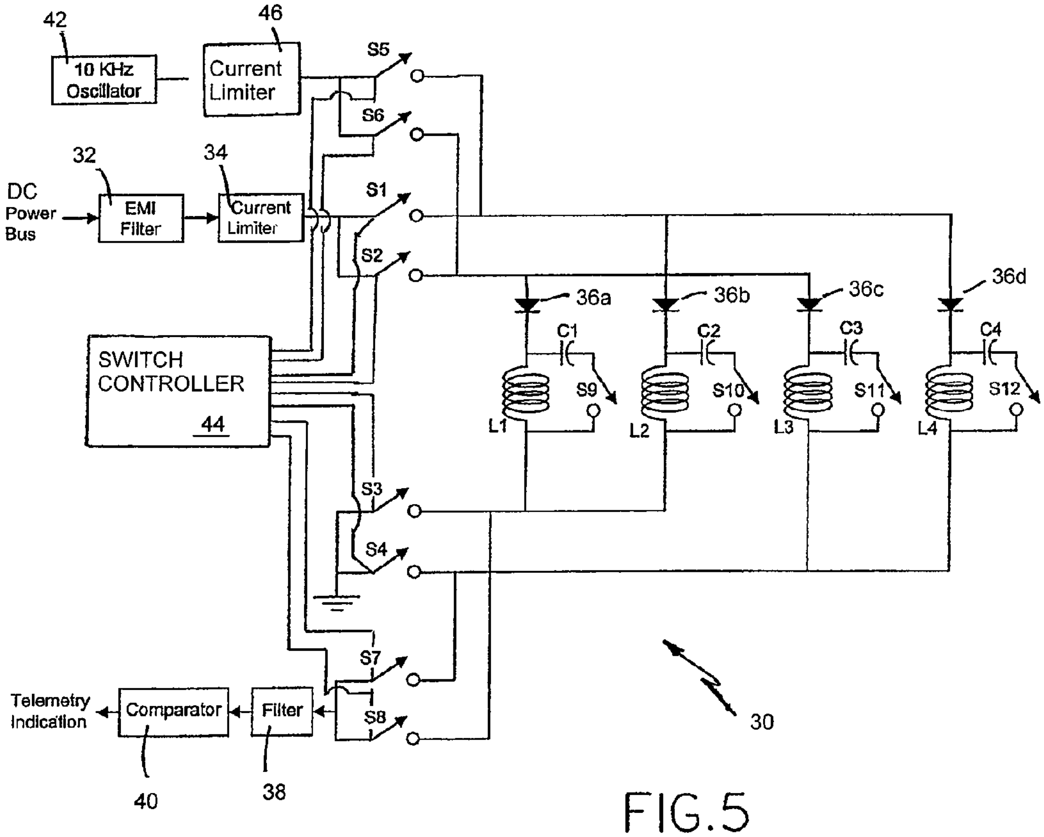
FIG. 5 is a combined block and schematic diagram of an RF switch telemetry control and monitoring system in accordance with the principles of the present invention.

RF switch telemetry control and monitoring system 30 further includes monitoring switches S5, S6, S7 and S8. Monitoring switches S5 and S6 are connected to a source of AC signals, which in FIG. 5 is represented as a 10 KHz oscillator 42, for providing a 10 KHz signal via a current limiter 46 to one of the coil and capacitor/microswitch combinations. The positions of the four monitoring switches S5-S8 determines to which coil and capacitor/microswitch combination the AC input signal is provided. Thus, with monitoring switches S5 and S8 closed, the AC input signal will be provided to a combination of a capacitor C2 and microswitch S10. Similarly, with monitoring switches S6 and S7 closed, the AC input signal would be provided to the combination of capacitor C3 and microswitch S11.

The present invention takes advantage of the fact that each capacitor and the RF switch coil to which it is connected exhibit inverse impedance responses to increasing AC frequency. For example, assuming that the capacitance of a capacitor is 0.1 microfarads and a low current AC source of 10 KHz is provided to each coil and capacitor combination, the coil impedance will be read when the microswitch connected to the coil and capacitor combination is closed. Because the RF switch coil inductance is roughly 1 henry, it will exhibit an impedance of approximately 60 Kohms. When the microswitch is closed, the detected impedance of the capacitor is approximately 170 ohms, as the addition of the parallel 60 Kohm coil impedance is too large to have any effect. This two orders of magnitude difference is very easily detected, even with very conservative component tolerances. When the microswitch closes, there will occur a significant inrush of current to the maximum value of current limiter 46. However, the AC current will undergo a very rapid exponential decay. If an equivalent 1 ohm series resistance is assumed, the current through the microswitch will decay to near zero in much less than one microsecond. This time is much too short for any appreciable heating of the microswitch which could adversely affect its contacts. Finally, the ceramic capacitors C1-C4 preferably used in the circuit are rugged, reliable, small, inexpensive and easily obtainable.

The activation of drive switches S1-S4 and monitoring switches S5-S8 is mutually exclusive. Thus, monitoring switches S5-S8 are not closed when driving the switch coils L1-L4 in changing the position of the RF switch. Similarly, drive switches S1-S4 are not closed when interrogating microswitches S9-S12 with an AC monitoring signal from the 10 KHz oscillator 42. If it is desired to interrogate, for example, microswitch S9, monitoring switches S6 and S8 are closed. The resulting AC output signal is filtered via filter 38, compared to a fixed reference DC level in comparator 40, and the result of the comparison reported as a telemetry indication of the position, or state, of the RF switche(es). To accomplish the mutually exclusive operation of the drive switches S1-S4 and the monitoring switches S5-S8, a switch controller 44 having the required logic is coupled to each of these switches. Switch controller 44 not only monitors the position of each of these switches, but also actuates the monitoring switches S5-S8 when the drive switches S1-S4 are open.

All of the switches and electronics of the inventive RF switch telemetry control and monitoring system 30 would typically be located in the telemetry and command electronics unit of a spacecraft. The spacecraft's telemetry and command electronics unit would also typically provide the timing and control for the inventive RF switch telemetry system 30.

While particular embodiments of the present invention have been shown and described, it will be obvious to those skilled in the relevant arts that changes and modifications may be made without departing from the invention in its broader aspects. Therefore, the aim in the appending claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for controlling and monitoring at least one multi-position RF switch, said apparatus comprising:

plural coils disposed in said at least one RF switch, each of said coils corresponding to a position of said at least one RF switch;

plural first switches connected to a DC source and further connected to said plural coils via a wiring network for directing a DC signal through at least one of said coils for switching said at least one RF switch to a selected position;

plural serially connected second switch and capacitor combinations each coupled across a respective coil;

plural third switches connected to an AC source and further connected to said plural coils and said second switch and capacitor combinations coupled across each coil for directing an AC input signal thereto via said wiring network, wherein a DC signal provided to a coil results in closure of a second switch coupled across said coil and provides an AC output signal representing the coil energized by the DC signal and the state of said at least one RF switch; and a controller coupled to said first and third switches for providing the AC signal to said third switches only when a DC signal is not being provided via said first switches to a coil.

2. The apparatus of claim 1 wherein each of said second switches is a microswitch.

3. The apparatus of claim 2 wherein each of said second microswitches is a field energized transistor (FET) microswitch.

4. The apparatus of claim 3 wherein each of said second microswitches is a two-position FET microswitch.

5. The apparatus of claim 1 wherein each of said first and third switches is a two-position switch.

6. The apparatus of claim 1 wherein said third switches include third input switches providing the AC input signal to said coils, said third switches further including third output switches receiving the AC output signal from said second switches.

7. The apparatus of claim 6 further comprising a rectifying filter and comparator combination coupled to said third output switches for converting the AC output signal to a DC signal and comparing the DC signal to a predetermined DC signal level.

8. The arrangement of claim 1 further comprising first and second current limiters respectively coupled to said DC source and to said AC source for limiting the DC and AC currents, respectively, provided to said at least one RF switch.

9. The apparatus of claim 1 wherein said coils each have an inductance on the order of 1 henry and said capacitors each have a capacitance on the order level of 0.1 microfarads.

10. The apparatus of claim 1 wherein the AC input signal has a frequency in the order of 10 KHz.

11. A method for determining the position of an RF switch having plural activating coils each corresponding to a position of the RF switch, wherein a DC signal is provided to one of said coils for changing the position of the RF switch, said method comprising the steps of:

connecting a combination of a capacitor and a serially coupled microswitch across each of said coils;

directing an AC input signal over writing to each of said plural coupled coil and serially coupled capacitor and microswitch combinations, wherein said AC input signal closes only the microswitch coupled to the activated coil associated with the position for the RF switch; and detecting an AC output signal over the same wiring over which the AC input signal is directed and which is also the same wiring which is used to control the RF switch, which is transmitted by said closed microswitch and which represents the position of the RF switch.

12. The method of claim 11 further comprising the step of limiting the AC input signal current provided to the coil and serially coupled capacitor and microswitch combinations.

13. The method of claim 12 wherein the AC input signal current to said microswitches is limited to 2 amps.

14. The method of claim 11 wherein an AC input signal is directed to each of said plural coils and serially coupled capacitor and microswitch combinations only when the RF switch position is not changing.

15. The method of claim 14 wherein an AC input signal is directed to each of said plural coils and serially coupled capacitor and microswitch combinations when a DC signal is not being provided to one of said coils.

16. The method of claim 11 further comprising the step of providing an AC input signal with a frequency of 10 KHz.

17. The method of claim 11 further comprising the step of providing each of said coils with an inductance of on the order of 1 henry, and each of said capacitors with a capacitance on the order of 0.01 microfarads.

18. The method of claim 11 further comprising the steps of rectifying the AC output signal and comparing the rectified signal to a predetermined DC signal level in detecting the position of the RF switch.

19. The method of claim 11 further comprising the step of directing the AC input signal to said plural coils and serially coupled capacitor microswitch combinations via plural input switches and directing the AC output signals to a detector via plural AC output switches.

20. The method of claim 11 further comprising the step of incorporating the RF switches with plural coils and plural serially coupled capacitor and microswitch combinations in a spacecraft.

21. The method of claim 11 wherein the method will determine the position of the RF switch regardless of whether or not RF energy is flowing through the RF switch.

* * * * *